United States Patent [19]

Rich

[11] Patent Number: 4,762,156
[45] Date of Patent: Aug. 9, 1988

[54] FUEL FILL VAPOR RECOVERY SYSTEM WITH VAPOR RECIRCULATION

[75] Inventor: Gregory E. Rich, Richmond, Mich.

[73] Assignee: General Motors Corporaton, Detroit, Mich.

[21] Appl. No.: 74,099

[22] Filed: Jul. 16, 1987

[51] Int. Cl.⁴ .......................... B01D 53/04; B67D 5/04
[52] U.S. Cl. ......................................... 141/46; 141/59;
141/286; 141/302; 55/387; 220/86 R; 220/85 VR
[58] Field of Search ........... 220/86 R, 85 VS, 85 VR, 220/85 F, DIG. 33; 55/387; 123/518-521; 141/44, 45, 46, 59, 285, 286, 301, 302

[56] References Cited

U.S. PATENT DOCUMENTS

| | | |
|---|---|---|
| 3,728,846 | 4/1973 | Nilsson ................................. 55/159 |
| 3,907,153 | 9/1975 | Mutty ................................. 220/86 R |
| 3,981,335 | 9/1976 | Deters ................................. 141/46 |
| 4,133,328 | 1/1979 | King ................................. 123/521 |
| 4,157,104 | 6/1979 | Lofguist, Jr. ................................. 141/292 |
| 4,572,394 | 2/1986 | Tanahashi et al. ................................. 220/86 R |
| 4,625,777 | 12/1986 | Schmidt ................................. 141/286 |
| 4,630,749 | 12/1986 | Armstrong et al. ................................. 220/86 R |
| 4,707,164 | 11/1987 | Harris ................................. 220/86 R X |
| 4,714,172 | 12/1987 | Morris ................................. 220/86 R |
| 4,719,949 | 1/1988 | Mears ................................. 141/301 |

Primary Examiner—Henry J. Recla
Assistant Examiner—Ernest G. Cusick
Attorney, Agent, or Firm—Patrick M. Griffin

[57] ABSTRACT

An on board refueling vapor recovery system employs a recirculation line and a regulating valve to prevent the entrainment of atmospheric air into the fuel, without the use of a tight or rubbing seal around the fuel nozzle.

2 Claims, 1 Drawing Sheet

FUEL FILL VAPOR RECOVERY SYSTEM WITH VAPOR RECIRCULATION

This invention relates to vehicle fuel vapor recovery systems in general, and specifically to a system for recovering the vapors displaced from the fuel tank during filling of the tank which incorporates a novel vapor recirculation means that also acts to reduce the volume of vapors so displaced.

BACKGROUND OF THE INVENTION

Emission control standards for vehicle fuel systems have been in force for some time, and a typical production motor vehicle now has a fuel vapor recovery system that includes a vapor storage canister. The canister receives and stores fuel vapors that would otherwise escape to atmosphere. The greatest volume of these vapors are produced from the carburetor fuel bowl, the so called "hot soak" losses, and also from the fuel tank as it sits, often referred to as the tank diurnal losses. Vapors are also lost during the fuel fill operation, due to the fact that the fuel flowing down from the nozzle must displace the air-fuel vapor mixture that is already in the tank, or else a positive pressure would develop in the tank that would soon prevent the fuel from entering the tank at all. These may be referred to as fuel fill losses. Clearly, with a nearly empty tank, the volume of fuel fill loss is not insignificant. In a conventional fuel system, a simple vent line running from the tank interior to the top of the filler neck just vents the displaced vapors out of the top of the filler neck to atmosphere. With emission standards becoming more rigorous, the future will require that some or most of the vapors previously allowed to escape vent to atmosphere be recovered as well.

Many designs for fuel vapor recovery systems are disclosed in the issued U.S. patents. These are mostly concerned, however, with the recovery of the hot soak vapors and tank diurnal losses described above, rather than with fuel fill losses. Even those systems that incorporate a vapor passage near the area at the top of the filler neck do not generally use that passage to recover fuel fill losses, or do not recover a significant portion of the fuel fill losses. For example, the U.S. Pat. No. 3,728,846 to Nilsson, while it discloses a lower vent line 4 that runs from the tank interior through the top of the filler neck 2, and an upper vent line 5 that runs from the top of the filler neck 2 to a storage canister, does not attempt to recover fuel fill losses. Instead, the lower vent line 4 is actually closed off during fuel fill, and displaced tank vapors are just vented out the filler neck to atmosphere by a conventionally acting vent pipe 8. The system disclosed in U.S. Pat. No. 4,572,394 to Tanahashi et al. does seek to recover some fuel fill losses, but it is concerned primarily with the smaller volume of pressurized vapors that escapes from the filler neck when the filler neck cap is first removed, referred to generally as the "puff loss." A separate vapor storage canister 5 surrounds a flared upper portion 9 of the filler neck 2, and the interior of the tank is vented through a vent tube 19 into the canister 5. A bellows type valve 12 is released when the filler neck cap 3 is removed, so that the pressurized vapors in the tank vent through tube 19 into the interior of the canister 5, rather than to atmosphere. However, the act of inserting the fuel nozzle pushes in the valve 12, and blocks tank vapors from going from the tank interior through tube 19 to the canister. While this would prevent the fuel fill loss vapors from escaping to atmosphere out the filler neck, those vapors still must go somewhere, or tank pressure will build up until fuel cannot enter. No structure is disclosed to deal with that problem. The system disclosed in U.S. Pat. No. 4,625,777 to Schmidt, assigned to the assignee of the subject invention, speaks to fuel fill losses to an extent, but is primarily concerned with regulating the pressure within the tank when the tank is closed, and also with handling tank diurnal losses. The system disclosed there has a fuel tank 10 with a filler neck 11 that opens into the tank 10 at a fairly high point in the tank. Thus, during most of the filling of the tank, displaced vapors can simply exit to atmosphere through the neck 11, and a conventional vent line is not needed. When the fuel rises high enough to cover the opening of the filler neck 11 into the tank 10, a vent line 14 that runs from a high point in the interior of the tank 10 to a port 29 near the top of the neck 11 takes over and provides a path for the fuel fill loss vapors, as seen in FIG. 4. From port 29, the fuel fill loss vapors can enter an opening in another valve 30 that is diametrically opposed to the port 29, and from there be routed to a canister. However, in the absence of a tight seal between the fuel nozzle and the neck 11, those fuel fill loss vapors entering the filler neck from port 29 could as easily exit to atmosphere as enter valve 30. Again, as with most patents, the system disclosed is not primarily concerned with fuel fill losses.

Those systems that are concerned with fuel fill losses generally use a tight seal between the nozzle and the filler neck, which will block fuel fill loss vapors from exiting to atmosphere. Of course, if the air-fuel vapors displaced from the tank during fuel fill cannot go to atmosphere, they must have an alternate path out of the tank, or, again, tank pressure will build up. The U.S. Pat. No. 3,907,153 to Mutty, assigned to the assignee of the subject invention, uses a bellows seal 92 on the fuel nozzle to seal the top of the filler neck 14, thereby blocking vapors from escaping to atmosphere. However, the act of removing the filler neck cap 18 also uncovers a port 52 at the top of the filler neck 14, which provides an unrestricted exit path out of the filler neck 14 and through a conduit 55 to the canister, so that there is no pressure build up in the tank. Likewise, the U.S. Pat. No. 4,630,749 to Armstrong et al., also assigned to the assignee of the subject invention, uses a tight seal 14 around the nozzle 54 to block fuel fill losses to the atmosphere, and a vent valve 28 that opens when the nozzle 54 is inserted provides a path for fuel vapors to the canister. Although not specifically discussed in the patent, it is contemplated that either the filler neck 26 would empty into the fuel tank at a high point within the tank, so that fuel vapors displaced from the tank during fill could go up the filler neck 26 and out to the canister, or a separate vent line would be provided to take displaced tank vapors to the filler neck, and then out to the canister.

While these last two systems work, the first requires that a bellows seal be available on the nozzle, which will not always be the case. Furthermore, it is desirable to eliminate a tight seal altogether in cases where the size of the nozzle is not standard, or where seal wear may be a problem. An alternative considered was the use of a liquid seal, instead of a tight seal around the nozzle. By liquid seal, what is meant is that the filler neck enters the tank at a fairly low point within the tank, with a configuration that assures that liquid fuel always blocks the neck to prevent vapors displaced from the tank from exiting up the neck and out to atmosphere. Then, some alternate and unrestricted path out of the tank interior to the canister would be provided from the tank for the displaced air-fuel vapors, since they can't go up the filler neck. This alternate path would be open only during fuel fill. However, research on such a liquid seal system uncovered a phenomenon that had apparently not been well appreciated in the art before. It was discovered that, with a liquid seal system, the volume of air-fuel vapors displaced from the tank was actually greater than the amount of empty tank volume being displaced by the entering fuel. Further research discovered that the rapid flow of fuel was pulling atmospheric air down the filler neck. While pulling atmospheric air down the filler neck certainly helped in preventing fuel vapors from exiting to atmosphere out the filler neck, it also was acting to entrain that drawn in air with the fuel. This increased the volume of air-fuel vapors within the tank interior that had to be blown through the canister in order for the fuel vapor part of the fuel-air mixture to be adsorbed and stored. That increase in the volume of vapor, and the consequent extra working of the granules in the canister was not a problem with the tight seal type of system, of course, since the entry of atmospheric air was blocked by the tight seal around the nozzle.

SUMMARY OF THE INVENTION

The subject invention provides a vehicle fuel vapor recovery system that recovers fuel fill losses without the use of a tight seal around the nozzle, and which substantially prevents the entrainment of atmospheric air and the consequent increase in the volume of air-fuel vapors that are displaced from the tank and routed through the storage canister. The preferred embodiment of the invention has a vapor storage canister and a venting line that runs from the interior of the fuel tank to the canister, through which vapors displaced from the tank during fuel fill are routed. A vapor vent valve that is open only during fuel fill is provided in the tank venting line. Vapors displaced from the tank will thus have an unrestricted path to the canister during fuel fill, while the path will be blocked otherwise, so as to not encourage the vaporization of fuel.

A shield portion in the filler neck has an opening therethrough sized so as to receive the fuel nozzle with an annular clearance sufficiently small to substantially block the entry of atmospheric air into the filler neck. Given the tendency of the fuel flow to draw in atmospheric air described above, substantially blocking the inflow of atmospheric air causes a negative pressure within the filler neck, just beneath the shield portion, the strength of which is proportional to the rate of the fuel flow. Even with the shield and the restriction that it creates, the higher negative pressures corresponding to higher rates of flow would, without more, still draw atmospheric air into the filler neck, which could be entrained with the fuel. The invention allows that negative pressure to instead draw air-fuel vapor from the tank interior through a recirculation line that branches from the tank venting line and runs to the negative pressure area just below the shield. From the area below the shield, the vapor is circulated back to the tank interior. This recirculated vapor takes the place, in effect, of the atmospheric air that would otherwise be drawn in and entrained with the fuel. Thus, the air entrainment problem is substantially avoided, but without using a tight seal around the nozzle.

In addition, there is a continuously variable regulating valve in the line that is normally closed, but which opens in response to the negative pressure. The regulating valve opens to a degree commensurate with the magnitude of the negative pressure which, again, depends on the strength of the fuel flow. Therefore, an equilibrium can be reached, and an optimal range of negative pressure will be maintained below the shield, high enough in magnitude so that recirculated vapors will not escape to atmosphere, but low enough in magnitude that atmospheric air will not be drawn in and entrained.

It is, therefore, an object of the invention to substantially prevent fuel fill losses in a vehicle fuel vapor recovery system, without using a tight seal around the nozzle.

It is another object of the invention to prevent such losses while also substantially preventing the entrainment of air into the fuel, so as to reduce the volume of vapors that would otherwise have to be routed through the storage canister.

It is yet another object of the invention to prevent fuel fill losses by providing a shield portion in the filler neck that substantially stops the inflow of atmospheric air to the filler neck, so that the fuel flow from the nozzle will create a negative pressure that will prevent vapors from escaping to the atmosphere, and also providing a recirculation line and regulating valve that recirculates vapor from the tank interior to the area below the shield so as to maintain the negative pressure in an optimal range to both prevent the escape or recirculated vapor to the atmosphere, and to prevent drawing in substantial atmospheric air to be entrained with the fuel.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
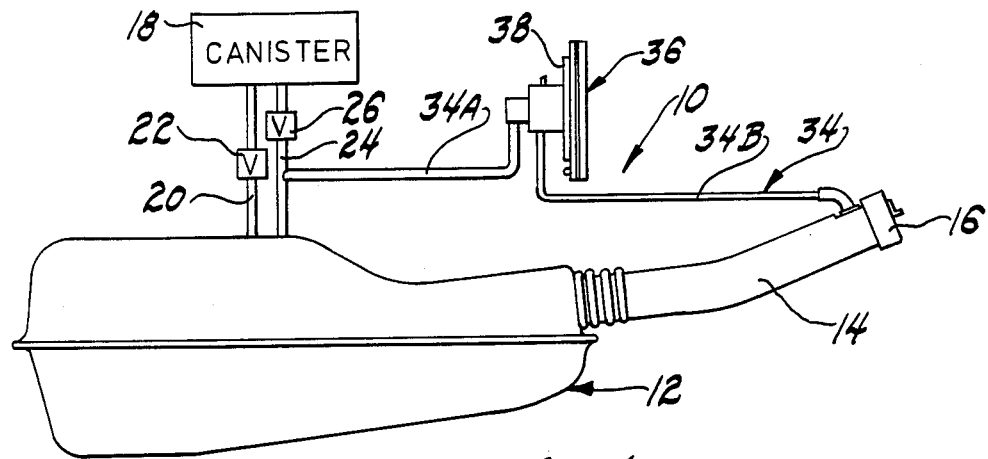
FIG. 1 is a diagrammatic view of a vehicle fuel tank incorporating the vapor recovery system of the invention.

Referring first to FIG. 1, a preferred embodiment of the vehicle fuel vapor recovery system of the invention, designated generally at 10, is shown for use with a vehicle fuel tank, designated generally at 12. Fuel tank 12 is essentially conventional, with a filler neck 14 closed by a removable cap 16. A vapor storage canister 18 is charged with activated charcoal granules or the like, which are capable of adsorbing the fuel portion of an air-fuel vapor mixture that is fed through canister 18. The fuel vapor is then later pulled by engine vacuum to be burned. From the interior of the tank 12, or from a vapor collection dome at the top of tank 12, a diurnal loss line 20 runs through a suitable tank pressure valve 22 to the canister 18, so that diurnal tank loss vapors may be recovered. Line 20 and valve 22 do not form part of the invention as such, but would generally be present in a production system. Also running from the interior of tank 12 to canister 18 is a tank venting line 24, which has a vapor vent valve 26 therein. Although the details of vent valve 26 are not crucial to the invention as such, it would be designed to open as filler neck cap 16 was removed, or as a conventional fuel filler nozzle 28 was inserted, but closed otherwise. Thus, venting line 24 provides an unrestricted path for the outflow of the tank air-fuel vapor mixture that is displaced during fuel fill, and which is routed through canister 18. The granules in the canister 18 adsorb and store the fuel component of the mixture, while the air component is passed to atmosphere. That particular path out of the tank 12 is closed at other times in order not to encourage the vaporization of fuel, which would increase the diurnal losses.

Figure 2:
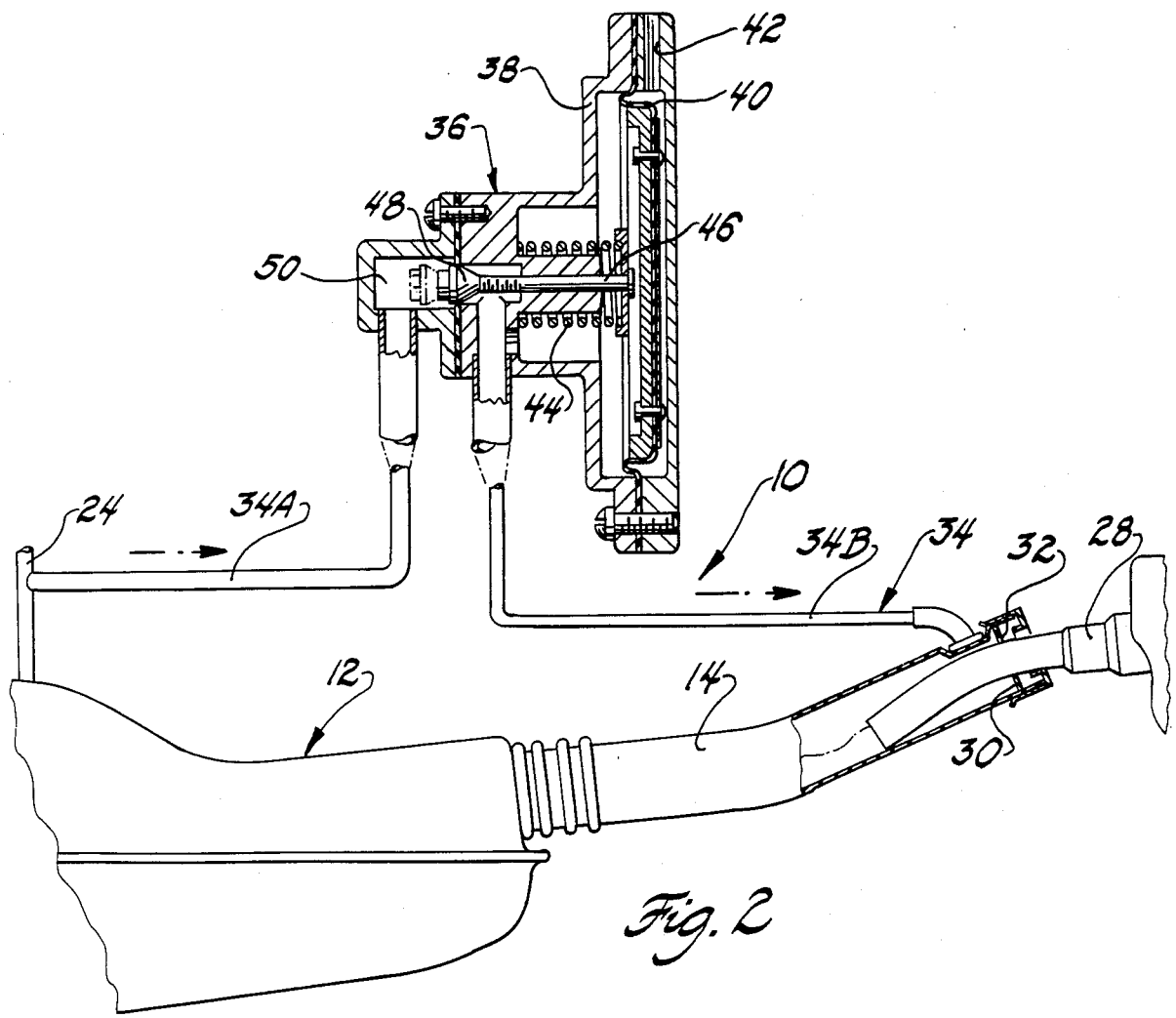
FIG. 2 is an enlarged view showing details of the regulating valve and the shield portion, with a nozzle inserted, and showing the closed position of the regulating valve in closed lines, and an open position in dotted lines.

Referring next to FIG. 2, cap 16 has been removed, and nozzle 28 inserted into the top of filler neck 14 preparatory to fuel fill. Vapors from the lower end of filler neck 14 would be prevented from escaping up and out of filler neck 14 by a conventional liquid trap type of seal at the lower juncture of filler neck 14 with tank 12, not illustrated. The liquid trap seal does nothing to stop the entrance of atmospheric air in the other direction down filler neck 14, however. A generally annular shield 30 is mounted inside the top of the filler neck 14. The central opening 32 through shield 30 has a diameter such that fuel nozzle 28 can be received therethrough with a small annular clearance. That annular clearance is sufficiently small to substantially block the entry of atmospheric air into the filler neck 14. Consequently, a forceful flow of fuel from nozzle 28, since it will tend to draw in atmospheric air in proportion to the strength of flow, will tend to create a negative pressure just below shield 30. Even with the restriction that shield 30 creates, the higher negative pressures that attend the higher rates of fuel inflow would draw entrainable atmospheric air into the filler neck 14, at least in the absence of some other means to prevent it. The invention provides such a prevention means, but without the necessity of a tight seal. A recirculation line, designated generally at 34, branches at one end from the tank venting line 24 at a point below vapor vent valve 26, and opens at the other end through the top of filler neck 14, just below the shield 30. Recirculation line 34 does not provide an uninterrupted path, however. A regulator valve, designated generally at 36, breaks recirculation line 34 into two parts, which are denoted 34A and 34B respectively. Regulator valve 36 includes a housing 38 and a reinforced diaphragm 40, which is exposed on its right side to atmospheric pressure through opening 42, and which is continually biased on its left side by a compression spring 44. A pintle 46 is joined to diaphragm 40 at one end, and mounts a cone shaped plug 48 at the other. Plug 48 sits within a stepped internal passage 50 of housing 38. The left recirculation line part 34A opens into passage 50 to the left of plug 48, and the right recirculation line part 34B opens into passage 50 to the right of plug 48. In the no flow condition of nozzle 28, the strength of spring 44 is sufficient to keep pintle 46 pushed to the right, so that plug 48 closes passage 50 and blocks recirculation line 34. Thus, before fuel flow begins, there is no escape path for vapors from the interior of tank 12 to the upper filler neck 14.

Referring still to FIG. 2, when fuel filling begins, the rush of pressurized liquid fuel from nozzle 28 creates the negative pressure below shield 30 described above. That negative pressure is communicated through recirculation line 34B to passage 50 between plug 48 and the left side of diaphragm 40. Atmospheric air then rushes into housing 38 through 42, moving diaphragm 40 to the left and compressing spring 44 until a force balance is again reached between the two sides of diaphragm 40. Concurrently with diaphragm 40 moving to the left, pintle 46 is moved to the left, as shown in dotted lines, and passage 50 is opened to allow vapor flow from tank 12, through the two parts of recirculating line 34, and to the area below shield 30. The flow through line 34 would be aided by the positive pressure in tank venting line 24. From the area below the shield 30, the vapor is circulated back to the interior of tank 12, moving down the filler neck 16. The strength of spring 44, the size of plug 48 relative to passage 50, and the size of the annular clearance between nozzle 28 and shield 30 would all be interrelated to one another, as well as to the negative pressure that one could be expected to be created by the flow of fuel from nozzle 28. All of these quantities, whatever they might be in a particular case, would be interrelated in such a way that a general equilibrium would be reached to create and maintain an optimal negative pressure, or range of negative pressure, below shield 30. That is, a negative pressure would be maintained that was high enough in magnitude so the amount of vapors recirculated through line 34 would not overbear the negative pressure and escape to atmosphere, but low enough in magnitude that atmospheric air will not be drawn down neck 14 through the annular clearance between shield 30 and nozzle 28. The continuously variable opening provide by the movable cone shaped plug 48 within the passage 50 allows for such an equilibrium to be reached in response to different rates and strengths of fuel flow from nozzle 28. There would likely be some hunting action involved within regulator valve 36 until such an equilibrium was found. No specific values for the quantities above are given, because they will differ for each specific situation. However, it can be seen that the air entrainment problem described above is substantially avoided, without the use of a tight seal, since the system is forced to recirculate vapors that are already there, rather than drawing in and entraining air from outside.

Variations in the preferred embodiment may be made within the spirit of the invention. For example, the regulator valve 36, instead of opening to atmosphere on one side of its diaphragm 40, could instead open on one side of diaphragm 40 to a lower point through filler neck 14, and on the other side to a higher point through filler neck 14, closer to the negative pressure area just below shield 30. This would also establish a pressure differential to move plug 48. Therefore, it will be understood that the invention is not intended to be limited to just the preferred embodiment disclosed.

The embodiments of the invention in which an exclusive property or privilege is claimed are defined as follows:

1. In a vehicle having a fuel tank that is filled through a filler neck that is open to the atmosphere when a fuel nozzle is inserted therein so that atmospheric air tends to be drawn into said filler neck by the rapid flow of fuel from said nozzle into said filler neck, a vapor recovery system for reducing the volume of air-fuel vapors produced in and displaced from said tank during fuel fill, and for storing said vapors, comprising,
   a vapor storage canister,
   a tank venting line running from the interior of said fuel tank to said canister which is open during fuel fill so that vapors displaced from said tank during fuel fill may pass to said canister to be stored, a shield portion in said filler neck sized so as to receive said fuel nozzle therethrough with a clearance sufficiently small to substantially block the entry of atmospheric air into said filler neck, and thereby create a negative pressure within said filler neck beneath said shield portion during fuel fill the strength of which is proportional to the rate of the fuel flow, a vapor recirculation line branching from said tank venting line and opening into said filler neck beneath said shield portion, and a regulating valve in said recirculation line that is normally closed, but which is opened by said filler neck negative pressure, so that a portion of the vapors displaced from said fuel tank during fuel fill will be recirculated from said tank interior, through said tank venting line, recirculation line and regulation valve to said filler neck and back to said tank interior as said fuel flows, said regulating valve further opening by a variable amount that increases as said filler neck negative pressure becomes more negative, whereby the portion of said fuel fill vapors so recirculated will be sufficiently small for low rates of fuel flow to prevent said filler neck negative pressure from exceeding atmospheric pressure allowing said recirculated vapors to escape past said shield portion to atmosphere, while the portion of said fuel vapors recirculated at higher rates of fuel flow and consequently greater negative pressures will be sufficiently great to substantially prevent atmospheric air from being drawn into said filler neck, thereby reducing the amount of atmospheric air entrained in said fuel and reducing the amount of air-fuel vapors produced in the tank interior during fuel fill.

2. In a vehicle having a fuel tank that is filled through a filler neck that is open to the atmosphere when a fuel nozzle is inserted therein so that atmospheric air tends to be drawn into said filler neck by the rapid flow of fuel from said nozzle into said filler neck, a vapor recovery system for reducing the volume of air-fuel vapors produced in and displaced from said tank during fuel fill, and for storing said vapors, comprising, a vapor storage canister, a tank venting line running from the interior of said fuel tank to said canister which is open during fuel fill so that vapors displaced from said tank during fuel fill may pass to said canister to be stored, a shield portion in said filler neck sized so as to receive said fuel nozzle therethrough with a clearance sufficiently small to substantially block the entry of atmospheric air into said filler neck, and thereby create a negative pressure within said filler neck beneath said shield portion during fuel fill the strength of which is proportional to the rate of the fuel flow, a vapor recirculation line branching from said tank venting line and opening into said filler neck beneath said shield portion, and a regulating valve separating said recirculation line into a first part opening into said filler neck and a second part opening into said tank venting line, said regulating valve having a housing with an internal passage intermediate said first and second recirculation line parts, said regulating valve including a spring biased diaphragm with said first line part opening to one side of said diaphragm and with the other side of said diaphragm open to atmospheric pressure, said diaphragm further mounting a cone shaped plug movable within said internal passage that separates said first and second recirculation line parts so as to form a continuously variable connection therebetween, whereby when there is no flow of fuel from said nozzle, said spring biased diaphragm will close said internal passage with said plug to block recirculation of vapors through said recirculation line, while, when there is fuel flow from said nozzle, atmospheric air will enter said valve and move said diaphragm so that said plug will open said internal passage to a degree commensurate with said negative pressure, and the portion of said fuel fill vapors recirculated through said recirculation line will thereby be sufficiently small for, low rates of fuel flow to prevent said filler neck negative pressure from exceeding atmospheric pressure and allowing said recirculated vapors to escape past said shield portion to atmosphere, but sufficiently great at higher rates of fuel flow and consequently greater negative pressures to prevent atmospheric air from being drawn into said filler neck, thereby reducing the amount of atmospheric air entrained in said fuel and reducing the amount of air-fuel vapors produced in the tank interior during fuel fill.

* * * * *